May 15, 1923.
B. F. CRUM
RESILIENT WHEEL
Filed Aug. 22, 1922
1,455,189
2 Sheets-Sheet 2
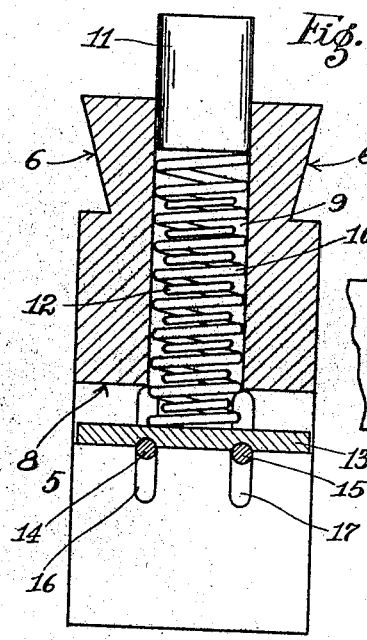
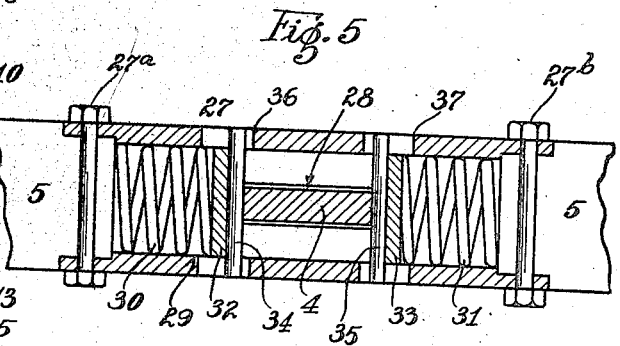
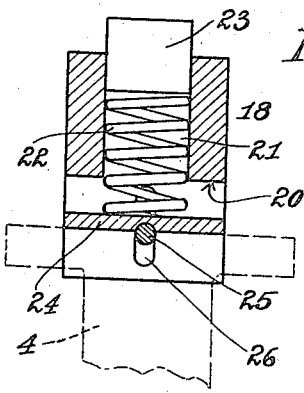
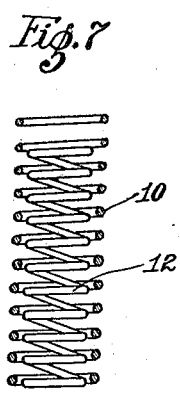
INVENTOR
BENJAMIN F. CRUM
BY
*Harry C. Schwede*
ATTORNEY Patented May 15, 1923.

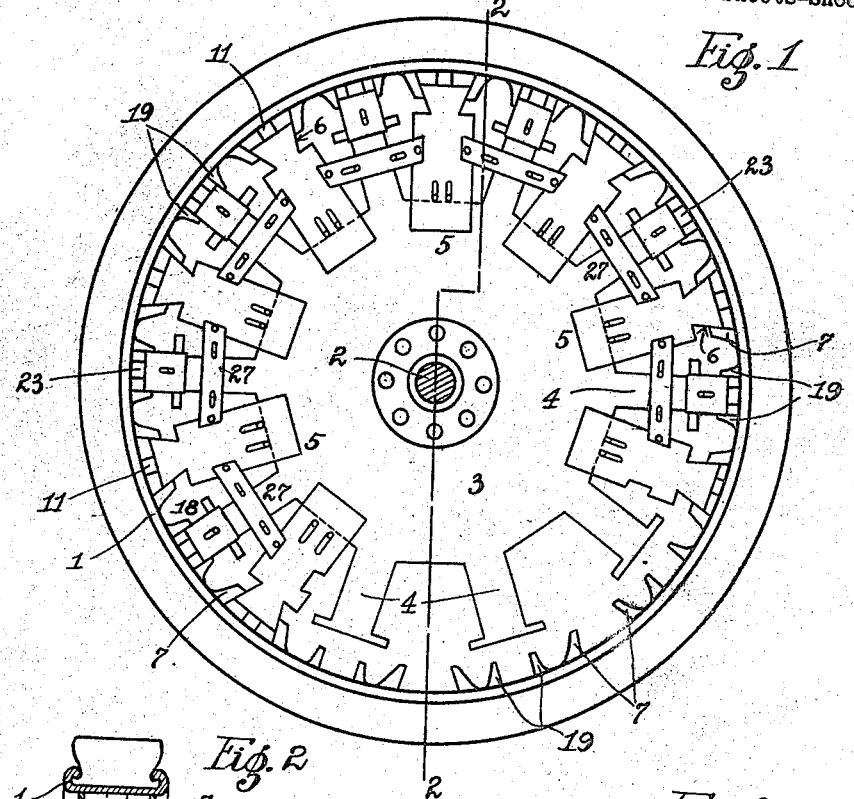
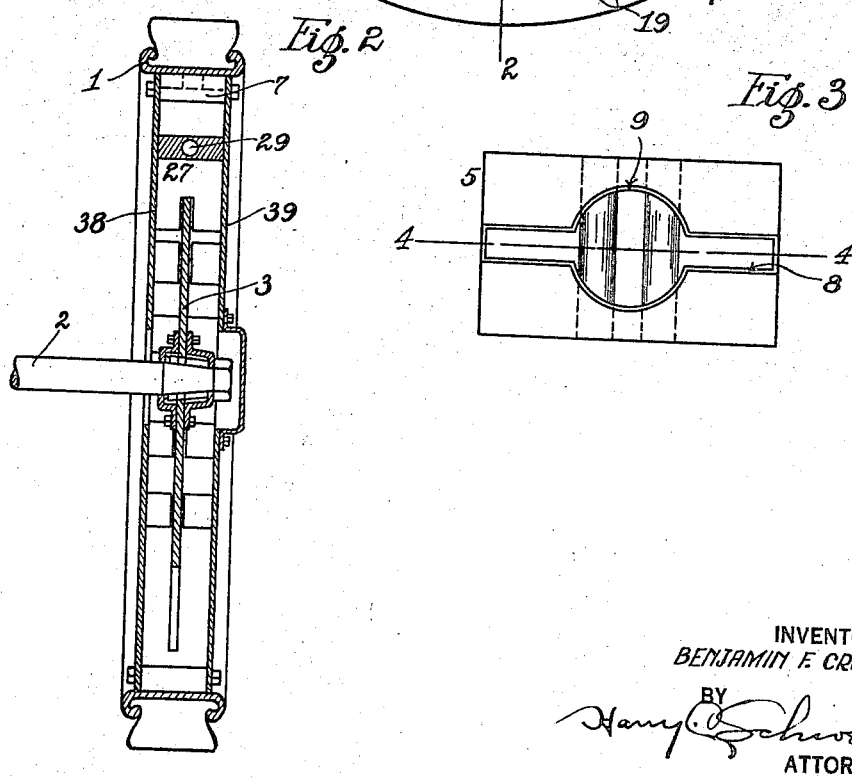

1,455,189

UNITED STATES PATENT OFFICE.

BENJAMIN F. CRUM, OF OAKLAND, CALIFORNIA.

RESILIENT WHEEL.

Application filed August 22, 1922. Serial No. 583,508.

*To all whom it may concern:*

Be it known that I, BENJAMIN F. CRUM, a citizen of the United States, residing at Oakland, in the county of Alameda and State of California, have invented certain new and useful Improvements in Resilient Wheels, of which the following is a specification.

My invention is an improved spring wheel.

The object of my invention is to provide a wheel which is simple in construction, efficient in operation, and so constructed that a plurality of springs are carrying the load. Separate springs are also provided to absorb any horizontal shock.

Referring to the drawing which forms a part of this specification:

Figure 1 is a side view of my wheel with the cover plate and a few of the springs and holders removed to show the construction.

Figure 2 is a sectional view taken on the line 2—2 of Figure 1.

Figure 3 is a bottom plan view of one of the radial spring holders.

Figure 4 is a transverse sectional view of the same.

Figure 5 is a transverse sectional view of one of the tangential spring holders.

Figure 6 is a transverse sectional view of one of the auxiliary spring holders.

Figure 7 is a side view partly in section of the main springs.

Referring more particularly to the drawing, the numeral 1 indicates the wheel rim and 2 the automobile axle. A vertical load carrying plate 3 is secured to the axle 2 inside of the rim 1. Extending from the plate 3 are a plurality of radial fingers 4 spaced a short distance apart.

Between the fingers 4 and straddling the plate 3 are positioned radial spring holders 5. The sides of the upper end of the holders 5 are inclined inwardly as at 6, and are adapted to fit between lugs 7 that depend from the rim 1. Grooves 8 are formed in the lower end of the holders which receive the load carrying plate 3. A longitudinal bore 9 extends through the holder 5. A spring 10 is positioned in the bore 9, and a block 11 rests against the end of the spring and projects from the holder 5 to bear against the rim 1. Springs 12 are positioned within the springs 10 to take up any excess load that may be placed on the springs 10. The springs 10 and 12 rest at their inner end on plates 13. Between the plates 13 and the load plate 3 are positioned rollers 14 and 15 that extend through slots 16 and 17 in the holders 5, respectively. These rollers reduce the wear on the plates due to their relative movement when a load is placed on the axle 2.

Auxiliary spring holders 18 straddle the end of the fingers 4, and extend between lugs 19 that depend from the rim 1. A notch 20 in the inner end of the holders 18 receive the fingers 4. A longitudinal bore 21 is formed in the holder 18 and a spring 22 is positioned therein. A plug 23 extends into the bore 21 and rests against the spring 22 and against the rim 1. The inner end of the spring 22 rests on a plate 24 and a roller 25 is positioned between the plate 24 and the end of the finger 4, said roller extending through a slot 26 in the holder 18.

Tangential spring holders 27 are pivoted to adjacent holders 5 by bolts 27$^a$ and 27$^b$. The fingers 4 extend through a slot 28 in the side of the holders 27. A transverse bore 29 extends through the holder 27. Springs 30 and 31 are positioned in the bore 29 and rest against the holders 5 and plates 32 and 33 respectively. Rollers 34 and 35 are positioned between the plates 32 and 33 respectively and the fingers 4. The rollers 34 and 35 extend through slots 36 and 37 respectively in the holder 27.

Cover plates 38 and 39 cover the rear and front of the wheel respectively and are secured to the lugs 7 by a suitable number of cap screws.

Having described my invention, I claim:

1. A resilient wheel comprising a rim, a load carrying plate, adapted to be secured to the automobile axle, radial fingers on said plate, main spring holders straddling said plate between said fingers, springs in said main holders positioned between said rim and said plate lugs projecting from said rim and adapted to engage the sides of the holders, auxiliary spring holders straddling the ends of said fingers, springs in said auxiliary holders positioned between said rim and said fingers and coupling spring holders pivoted to said main spring holders and encircling said fingers and springs in said coupling holders positioned between said fingers and said main holders.

2. A resilient wheel comprising a rim, a load carrying plate adapted to be secured to the automobile axle, radial fingers on said plate, main radial spring holders straddling said plate between said fingers, said spring holders having a central bore formed therein, and a spring positioned in said bore between said rim and said plate.

3. A resilient wheel comprising a rim, a load carrying plate adapted to be secured to the automobile axle, radial fingers on said plate, main spring holders straddling said plate between said fingers, means for yieldably joining said holders and said rim, spring means within said holder adapted to bear against said rim and said plate, auxiliary spring holders straddling the end of said radial fingers, and springs within said holders adapted to bear against said rim and said fingers.

In testimony whereof I affix my signature.

BENJAMIN F. CRUM.